(12) United States Patent
Lafe et al.

(10) Patent No.: US 6,449,658 B1
(45) Date of Patent: Sep. 10, 2002

(54) METHOD AND APPARATUS FOR ACCELERATING DATA THROUGH COMMUNICATION NETWORKS

(75) Inventors: Olurinde E. Lafe, Chesterland; Atila Boros, University Heights; Valeriy Tsuryk, Richmond Heights, all of OH (US)

(73) Assignee: QuikCAT.com, Inc., Mayfield Village, OH (US)

( * ) Notice: Subject to any disclaimer, the term of this patent is extended or adjusted under 35 U.S.C. 154(b) by 0 days.

(21) Appl. No.: 09/442,797

(22) Filed: Nov. 18, 1999

(51) Int. Cl.[7] .............................................. G06F 15/16
(52) U.S. Cl. ........................ 709/247; 709/219; 709/203
(58) Field of Search ................................ 709/247, 219, 709/229, 203

(56) References Cited

U.S. PATENT DOCUMENTS

| | | | | |
|---|---|---|---|---|
| 5,627,829 A | | 5/1997 | Gleeson et al. ............. 370/230 |
| 5,638,498 A | | 6/1997 | Tyler et al. .................. 395/117 |
| 5,673,322 A | * | 9/1997 | Pepe et al. ................... 709/219 |
| 5,768,525 A | * | 6/1998 | Kralowetz et al. .......... 709/228 |
| 5,838,927 A | * | 11/1998 | Gillon et al. ................ 709/247 |
| 5,872,845 A | | 2/1999 | Feder .......................... 380/18 |
| 5,938,737 A | * | 8/1999 | Smallcomb et al. ........ 709/247 |
| 6,111,566 A | | 8/2000 | Chiba et al. ................. 345/202 |
| 6,112,250 A | * | 8/2000 | Appelman ................... 709/247 |
| 6,125,209 A | | 9/2000 | Dorricott .................... 382/233 |
| 6,144,996 A | | 11/2000 | Starnes et al. .............. 709/217 |
| 6,163,796 A | | 12/2000 | Yokomizo ................... 709/203 |

FOREIGN PATENT DOCUMENTS

| JP | 08331173 | 12/1996 |
|---|---|---|
| JP | 10334003 | 12/1998 |
| WO | 97/49252 | 12/1997 |

OTHER PUBLICATIONS

Nand, A., "Mail Servers with Embedded Data Compression Mechanism," document number XP–002164409, dated Mar. 30, 1998, 1 page.

* cited by examiner

Primary Examiner—Ayaz Sheikh
Assistant Examiner—Philip B. Tran
(74) Attorney, Agent, or Firm—Michael A. Jaffe (57) ABSTRACT

A method and apparatus for accelerating data transport through communication networks (e.g., the Internet) is taught. The data sources may include Internet web pages, electronic mails, computer files, digitized pictures, voice and video. The method combines smart content-based data compression schemes with intelligent routing to efficiently move information across a network. The apparatus works with existing communications protocols (e.g., TCP/IP, UDP, HTTP, SMTP and POP3) and fits transparently with Internet browsing applications.

31 Claims, 9 Drawing Sheets

METHOD AND APPARATUS FOR ACCELERATING DATA THROUGH COMMUNICATION NETWORKS

FIELD OF INVENTION

The present invention generally relates to a method and apparatus for improving data transfer rates, and more particularly to a method and apparatus for accelerating data through communication networks.

BACKGROUND OF THE INVENTION

The bandwidth problem is a lingering issue with many communication networks, particularly the Internet. No Internet surfer enjoys the long delays associated with viewing graphically intensive web sites. The use of the Internet continues to grow at an exponential rate. As the number of users has increased, so has the need for a solution to deliver data over the Internet quickly.

Most Internet users connect to the Internet by dialup modems running at 28.8 kilobits per second (kps) to 56.6 kps. Wireless mobile users have a bigger bandwidth problem. The best wireless connections are currently below 19.2 kps. Corporate landline users generally enjoy faster connections of 128 kps or more. However, even at the higher connection speeds, users can find themselves waiting endlessly for a web site to download to their personal computer because of the size of data at the site.

The majority of web sites that tend to hold a user's interest use color-rich graphic files for appeal. These graphics can consume over 50% of the data volume found within the web site. Digital audio and video files similarly require millions of bytes per second for transmission. The balance of the contents on a typical web page consists of text files, most of which are transmitted in raw uncompressed form.

Due to the rapid growth of Internet usage and the large size of most digital files on web pages, it has become apparent that a dire need exists for a seamless transport engine to move data quickly through the Internet. The ideal transport engine would allow the Internet user to control the rate at which information is received or sent.

Figure 1:
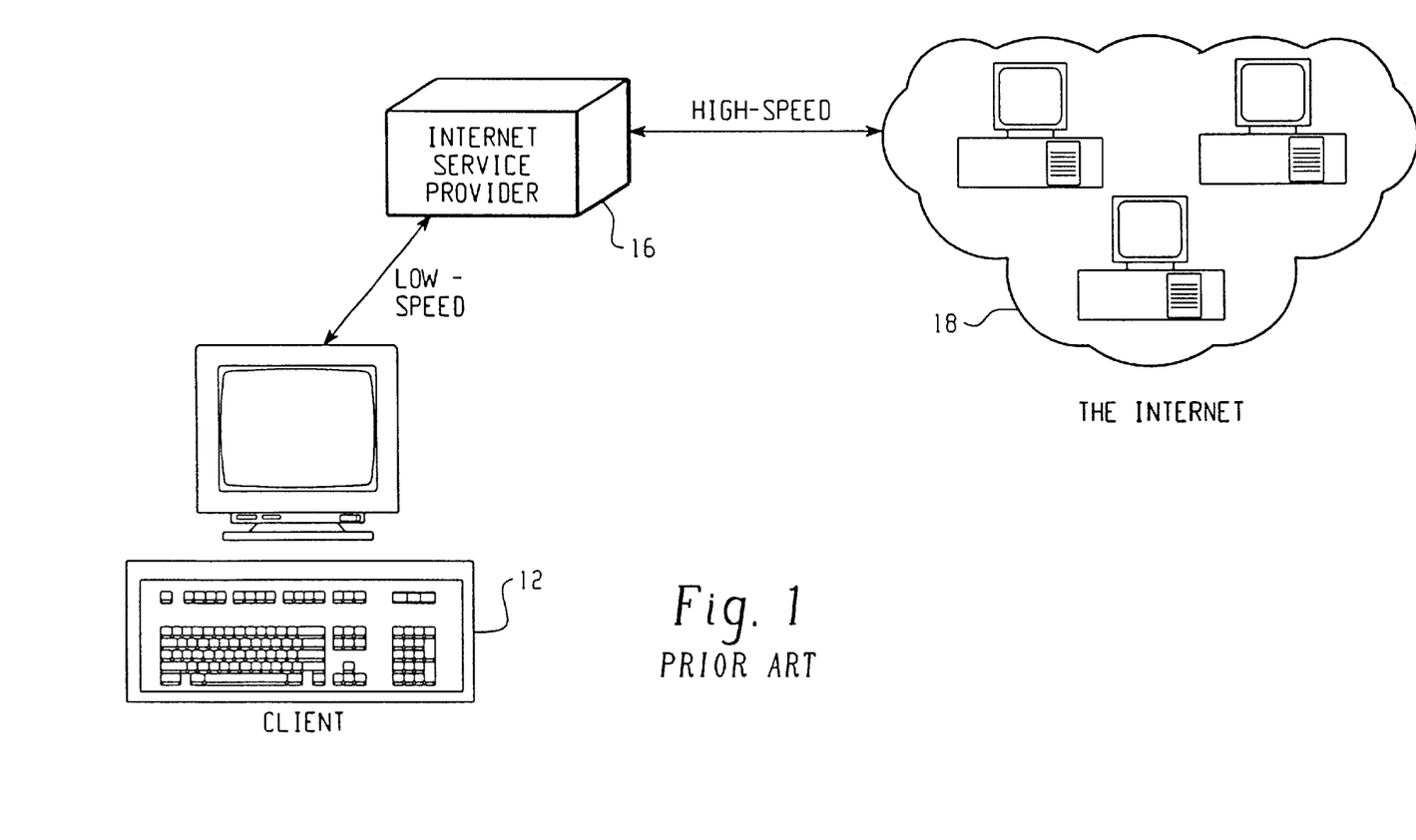
FIG. 1 is an illustration of conventional information flow to and from a Client (Internet user) that is connected to the Internet through an Internet Service Provider (ISP)

FIG. 1 illustrates a conventional prior art arrangement for communications between a client and the Internet. In particular, a low speed communications link is utilized between a Client 12 and an Internet service provider (ISP) 16. This low speed communications link will typically take the form of a conventional telephone voice line of the Plain Old Telephone System (POTS) or a Cellular Wireless Network. A high speed communications link (e.g., T1/T3 carrier) is utilized between the Internet 18 and ISP 16. It is readily apparent that the data transfer rate will be constrained by the low speed communications link between client 12 and ISP 16. Therefore, despite the high speed communications link provided between ISP 16 and the Internet 18, the user of Client 12 will experience slow data transfer rates due to the low speed communications link between Client 12 and ISP 16. The present invention addresses this and other drawbacks of the prior art.

It can be readily appreciated that the need often arises to transmit large amounts of data across a variety of communication networks (e.g., the Internet; the Plain Old Telephone System (POTS); Cellular Wireless Networks; Local Area Networks (LAN); Wide Area Networks (WAN); and Satellite Communications Systems). A major example is digital audio data. The volume of data required to encode raw audio data is large. Consider a stereo audio data sampled at 44100 samples per second and with a maximum of 16 bits used to encode each sample per channel. A one-hour recording of a raw digital music with that fidelity will occupy about 606 megabytes (MB) of storage space. To transmit such an audio file over 56 kilobits per second communications channel (e.g., the rate supported by most POTS through modems), will take over 24.6 hours.

One approach for dealing with the bandwidth limitation is to compress the data before transmission. For certain kinds of data (e.g., text, computer executable file, financial data) the compression/decompression process must reproduce a perfect reproduction of the transmitted data when decoded. Such a process is described as being "lossless." In some other cases, especially when the transmitted information is to be perceived and not to be read (e.g., pictures, audio, video data) the compression/decompression process need not result in a perfect reconstruction of the transmitted data. The process is described as being "lossy" when the reconstructed data is not a perfect copy of the original.

The present invention provides a method and apparatus for transmitting and receiving data at faster rates through communication networks, such as the Internet.

Moreover, the present invention selectively employs both "lossless" and "lossy" compression methods in order to compress the information being moved across a given network.

SUMMARY OF THE INVENTION

According to the present invention there is provided a system for data transfer acceleration comprising: (1) an accelerator client for intercepting data transferred between a client computer and a communications network service provider via a first communications link, wherein said accelerator client compresses data transmitted from the client computer to the communications network service provider, and forwards said compressed data to said communications network service provider, and said accelerator client decompresses compressed data transmitted from the communications network service provider to the client computer, and forwards said uncompressed data to said client computer; and (2) an accelerator server for intercepting data transferred between the communications network service provider and a communications network, via a second communications link, wherein said accelerator server decompresses compressed data transmitted from the communications network service provider to the communications network, and forwards the uncompressed data to the communications network, and said accelerator server compresses data transmitted from the communications network to the communications network service provider, and forwards the compressed data to the communications network service provider.

According to another aspect of the present invention there is provided a method of data transfer acceleration comprising: intercepting data transferred between a client computer and a communications network service provider via a first communications link, wherein data transmitted from the client computer to the communications network service provider is compressed, and forwarded to said communications network service provider, and decompressing compressed data transmitted from the communications network service provider to the client computer, and forwarding said uncompressed data to said client computer; and intercepting data transferred between the communications network service provider and a communications network, via a second communications link, wherein compressed data transmitted from the communications network service provider to the communications network is decompressed, and forwarded to the communications network, and data transmitted from the communications network to the communications network service provider is compressed, and forwarded to the communications network service provider.

According to still another aspect of the present invention there is provided a system for data transfer acceleration comprising: (1) an accelerator client for intercepting data transferred between a client computer and a communications network service provider via a first communications link, wherein said accelerator client selectively compresses data transmitted from the client computer to the communications network service provider, and forwards the intercepted data to said communications network service provider, and said accelerator client decompresses any compressed data transmitted from the communications network service provider to the client computer, and forwards the intercepted data to said client computer; and (3) an accelerator server for intercepting data transferred between the communications network service provider and a communications network, via a second communications link, wherein said accelerator server decompresses any compressed data transmitted from the communications network service provider to the communications network, and forwards the intercepted data to the communications network, and said accelerator server selectively compresses data transmitted from the communications network to the communications network service provider, and forwards the intercepted data to the communications network service provider.

In accordance with yet another aspect of the present invention there is provided a method of data transfer acceleration comprising:

intercepting data transferred between a client computer and a communications network service provider via a first communications link, wherein data transmitted from the client computer to the communications network service provider is selectively compressed, and forwarded to said communications network service provider, and decompressing compressed data transmitted from the communications network service provider to the client computer, and forwarding said uncompressed data to said client computer; and intercepting data transferred between the communications network service provider and a communications network, via a second communications link, wherein compressed data transmitted from the communications network service provider to the communications network is decompressed, and forwarded to the communications network, and data transmitted from the communications network to the communications network service provider is selectively compressed, and forwarded to the communications network service provider.

An advantage of the present invention is the provision of a method and apparatus for increasing a data transfer rate.

Another advantage of the present invention is the provision of a method and apparatus for data transfer acceleration that operates independently of any special network protocol.

Another advantage of the present invention is the provision of a method and apparatus for data transfer acceleration that operates whenever a TCP/IP network connection to an Accelerator Server is available.

Another advantage of the present invention is the provision of a method and apparatus for data transfer acceleration that operates with the public Internet, independently from any Internet service provider (ISP).

Another advantage of the present invention is the provision of a method and apparatus for data transfer acceleration that operates within a corporate intranet.

Still another advantage of the present invention is the provision of a method and apparatus for data transfer acceleration that operates through firewalls.

Still another advantage of the present invention is the provision of a method and apparatus for data transfer acceleration that operates with corporate HTTP proxies.

Yet another advantage of the present invention is the provision of a method and apparatus for data transfer acceleration that operates in Virtual Public Networks.

Yet another advantage of the present invention is the provision of a method and apparatus for data transfer acceleration that supports both wireless and wire line systems.

Yet another advantage of the present invention is the provision of a method and apparatus of data transfer acceleration that selectively uses "lossless" and "lossy" methods in order to compress/decompress data.

Still other advantages of the invention will become apparent to those skilled in the art upon a reading and understanding of the following detailed description, accompanying drawings and appended claims.

BRIEF DESCRIPTION OF THE DRAWINGS

The invention may take physical form in certain parts and arrangements of parts, a preferred embodiment and method of which will be described in detail in this specification and illustrated in the accompanying drawings which form a part hereof, and wherein.

DETAILED DESCRIPTION OF THE PREFERRED EMBODIMENT

The present invention provides a method and apparatus for sending and receiving data at a faster rate in a communication network, such as the Internet. The present invention generally operates as follows: when a Client (i.e., the user) requests information (e.g., a page from a web site) from the Internet, the request is processed through an Accelerator Server (AS). A command is issued by the AS via the Internet for the requested web page to be imported into the AS. The received contents of the web page (including images, text, audio and video data) are then compressed by the AS. The compressed data is sent back to the Client. However, a decoder, which forms a part of an Accelerator Client (AC), intercepts the data sent to the client and decompresses the compressed data, and rebuilds the requested page for display at the Client. The total time it takes to deliver the requested page is reduced, because a smaller data chunk (i.e., compressed data rather than uncompressed data) is transported through low speed communication lines typically used between the Client and the Internet. The present invention also incorporates the acceleration of electronic mail (email) during both the sending and receiving phases, as will also be described in detail below.

In accordance with a preferred embodiment of the present invention, data acceleration is achieved by replacing the Client's slow connection with a compressed link to the Accelerator Server, as will be described below. This allows the user to transfer large amounts of data more quickly over the slow connection. The Accelerator Server is connected to the Internet or a corporate intranet by a high-speed connection. The effect is that the user realizes much higher data transfer speeds, because the same amount of data can be transferred in less time.

The Accelerator Server and Accelerator Client use intelligent, content-based compression/decompression algorithms that can compress pictures, images (e.g., JPEG and GIF files) and other media objects with minimal perceptional quality loss achieving much higher compression ratios than conventional lossless compression algorithms. Lossless compression can be used for non-media objects, such as text, formatting, executables and unsupported media objects. In contrast, lossy compression algorithms can be used for media objects, such as images, video and audio. Examples of compression algorithms include, but are not limited to cellular automata transforms (CAT), discrete cosine transform, wavelets, fractal image compression, Huffman coding, arithmetic coding and dictionary techniques (e.g., LZ77 and LZ78).

Table I, set forth below, provides a glossary of terms commonly used in connection with Internet communications:

TABLE I

| | |
|---|---|
| HTTP | Hypertext Transfer Protocol: Used to download and upload content from the World Wide Web. |
| HTML | Hypertext Markup Language: The set of "markup" symbols or codes inserted in a file intended for display on a World Wide Web browser. |
| SMTP | Simple Mail Transfer Protocol: Used to send mail messages in Internet. |
| POP3 | Post Office Protocol version 3: Used to retrieve messages from host mailboxes. |
| MIME | Multi-Purpose Internet Mail Extensions: Used to exchange contents of different types other than text, which was the only content originally meant to transfer using SMTP and POP3. It allows transferring attachment of multimedia and document content, as well as nested and forwarded attachments. It defines codes for each content type and encoding type like BASE64, QUOTED-PRINTABLE, and the like. |
| BASE64 | An encoding scheme, which encodes binary content, which can include non-printable and control into printable characters. It makes content longer, but BASE64 encoded content can travel through conventional SMTP and POP3 host, which cannot process binary content. |

TABLE I-continued

| | |
|---|---|
| RPC | Remote Procedure Call: Used to execute a function call at a remote computer, without knowledge of the underlying network. |
| DCOM | Distributed Component Object Model: A set of Microsoft concepts and program interfaces in which client program objects can request services from server program objects on other computers in a network.<br>The Component Object Model (COM) provides a set of interfaces allowing clients and servers to communicate within the same computer (running a Windows 95 or NT system). |
| JPG, JPEG | Joint Photographic Experts Group: A graphic image format, based on the Discrete Cosine Transform, created by choosing from a range of compression qualities. |
| GIF | Graphics Interchange Format: One of the two most common file formats for graphic images on the World Wide Web. |

Figure 2:
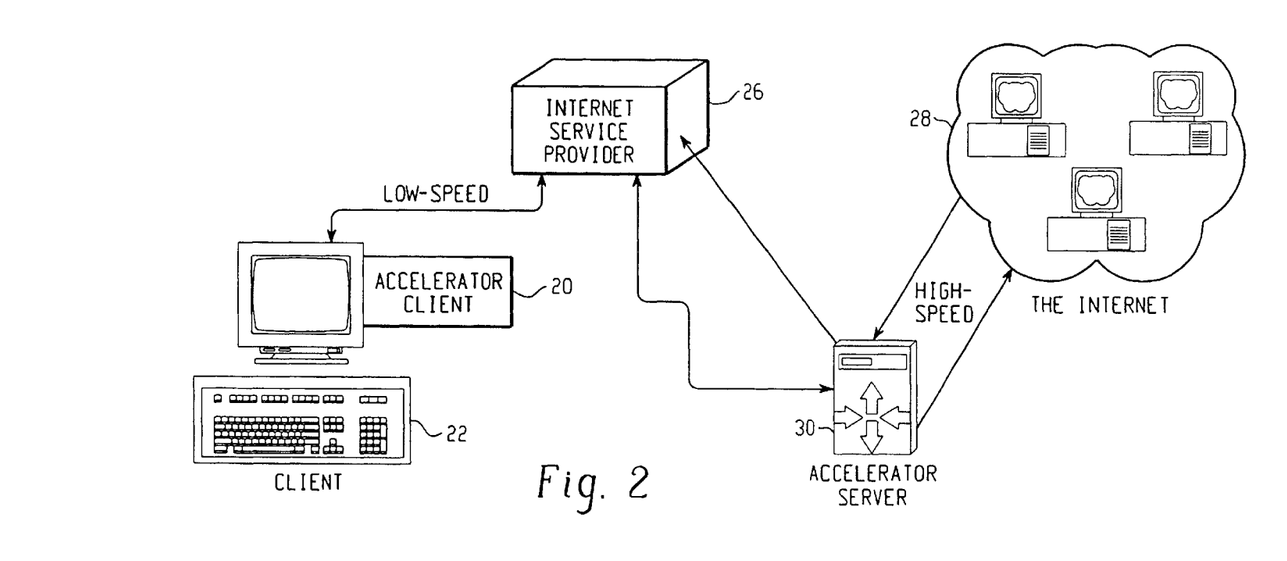
FIG. 2 is an illustration of the information flow between a Client and the Internet, according to a preferred embodiment of the present invention.
Figure 4:
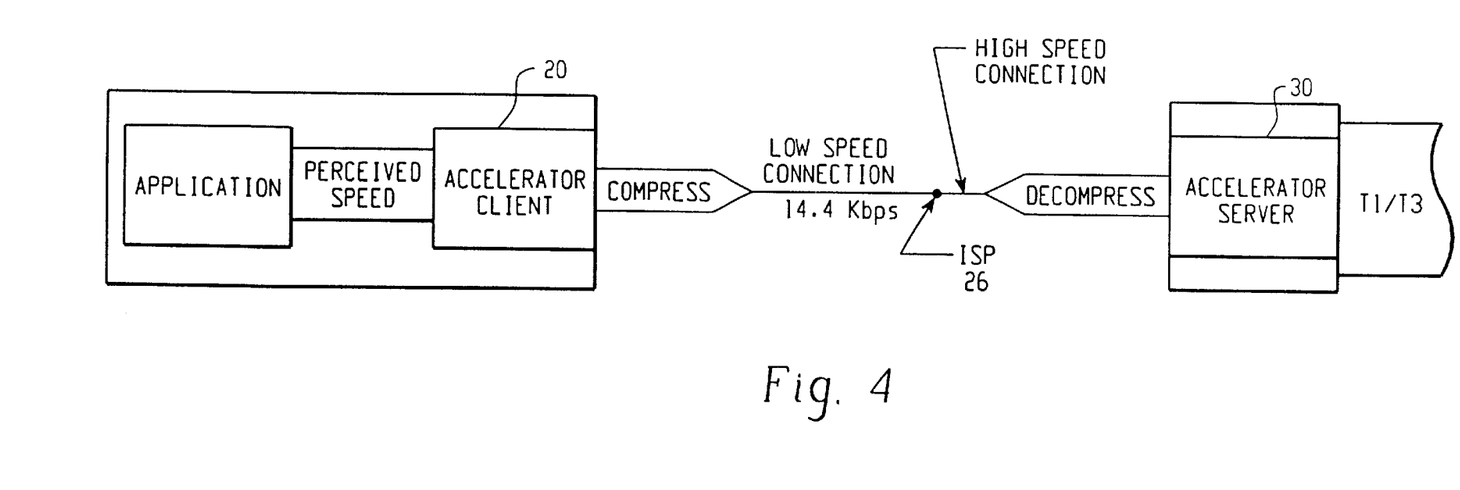
FIG. 4 illustrates the connection between an Accelerator Client and an Accelerator Server via a low-speed communications link.

Referring now to the drawings wherein the showings are for the purposes of illustrating a preferred embodiment of the invention only and not for purposes of limiting same, FIG. 2 illustrates the flow of information between a Client and the Internet, according to a preferred embodiment of the present invention. A system according to a preferred embodiment of the present invention may include a Client 22, an Accelerator Client (AC) 20, an ISP 26, an Accelerator Server (AS) 30 and a communications network, such as the Internet 28. A low speed communications link may be utilized between Client 22 and ISP 26. This low speed communications link will typically take the form of a conventional telephone voice line of the Plain Old Telephone System (POTS) or a Cellular Wireless Network. A high speed communications link (e.g., a T1/T3 carrier) is typically utilized between ISP 26 and AS 30, and between AS 30 and the Internet 28. The present invention utilizes data compression to improve the data transfer rate through the slowest communications link of the system, namely, the low speed communications link between client 22 and ISP 26. A simplified illustration of the data flow is shown in FIG. 4.

Accelerator Client 20 is an application that runs on Client 22 (i.e., the user's computer) or on a separate special-purpose device or computer system used in connection with Client 22. In a preferred embodiment, it supports the following Internet. protocols: HTTP (Web), SMTP, and POP3 (email), all of which are defined above.

Accelerator Server 30 is an application that runs on a general-purpose server computer or on a special-purpose device or computer system. In a preferred embodiment, it also supports the following Internet protocols: HTTP (Web), SMTP, and POP3 (email).

Operation of the system shown in FIG. 2 will now be described in detail. In the embodiment illustrated in FIG. 2, Accelerator Client 20 runs on client computer 22. Accelerator Client 20 communicates with browsers and email clients running on client 22 using a special IP address 127.0.0.1, known as "localhost". This is simply a shortcut, which is used by TCP/IP for referring to the computer on which the program is running. This is a convenient way to force a browser or an email client application to communicate with a program running on the same computer using the concept of TCP/IP networking. Accelerator Client 20 intercepts the transfer protocol (HTTP, SMTP, POP3) and extracts its contents, then selectively performs compression when sending, and decompression when receiving compressed contents. It should be appreciated that Accelerator Client 20 will decide whether compression is worthwhile for improved data transfer rates. Therefore, not all data will necessarily be compressed in all cases.

Figure 5:
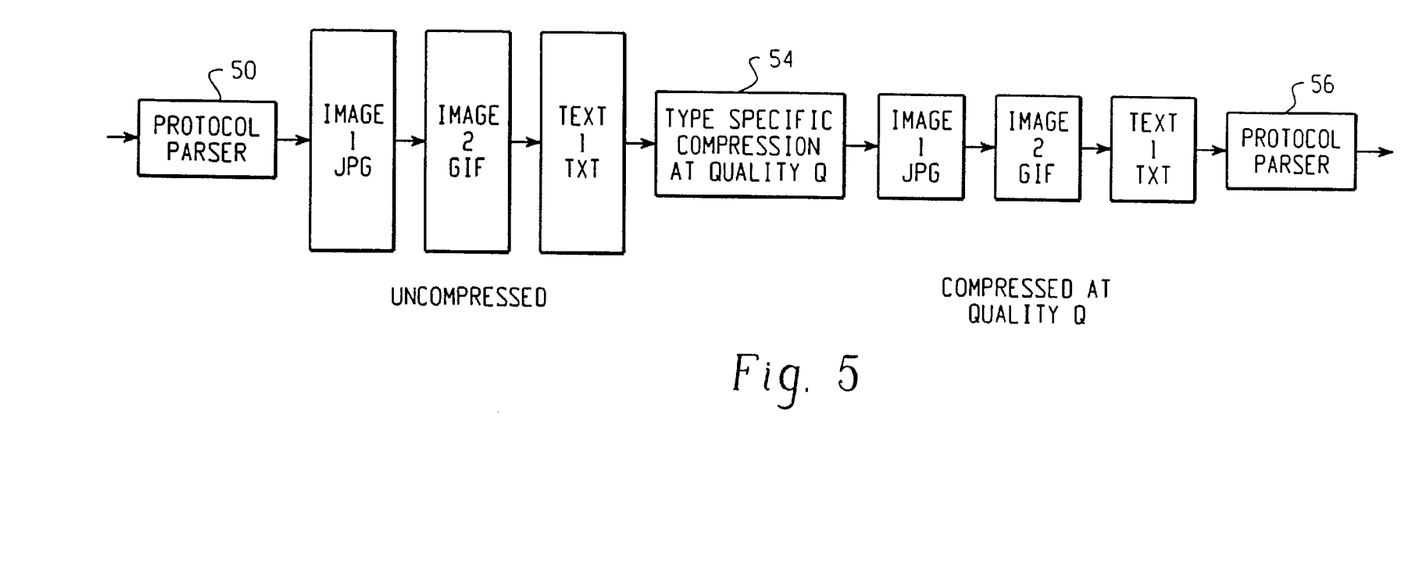
FIG. 5 illustrates the general process for compression of various types of data objects.

Referring now to FIG. 5, the process of compression will be described in detail. Accelerator Client 20 and Accelerator Server 30 include a protocol parser 52, a compressor 54, and a protocol assembler 56. Protocol parser 52 breaks a data document into media and non-media objects (e.g., image objects, text objects, etc.). Compressor 54 utilizes a suitable compression technique to compress each object at a quality Q. Protocol assembler 56 receives the compressed objects, decompresses the compressed objects and reassembles them accordingly. Protocol assembly 56 includes a decompressor. It should be understood that in most cases non-media objects (e.g., text objects) are subject to lossless compression (i.e., Q=100).

In accordance with an embodiment of the present invention wherein a CAT hierarchical compression method is used, the Accelerator Server 30 may determine that one or more web pages or other data is frequently requested. Accordingly, it will cache the web pages or other data in compressed form at Q=100. By caching at Q=100, the Accelerator Server 30 can provide the web page or other data at any level of compression quality Q requested by a client.

Figure 3:
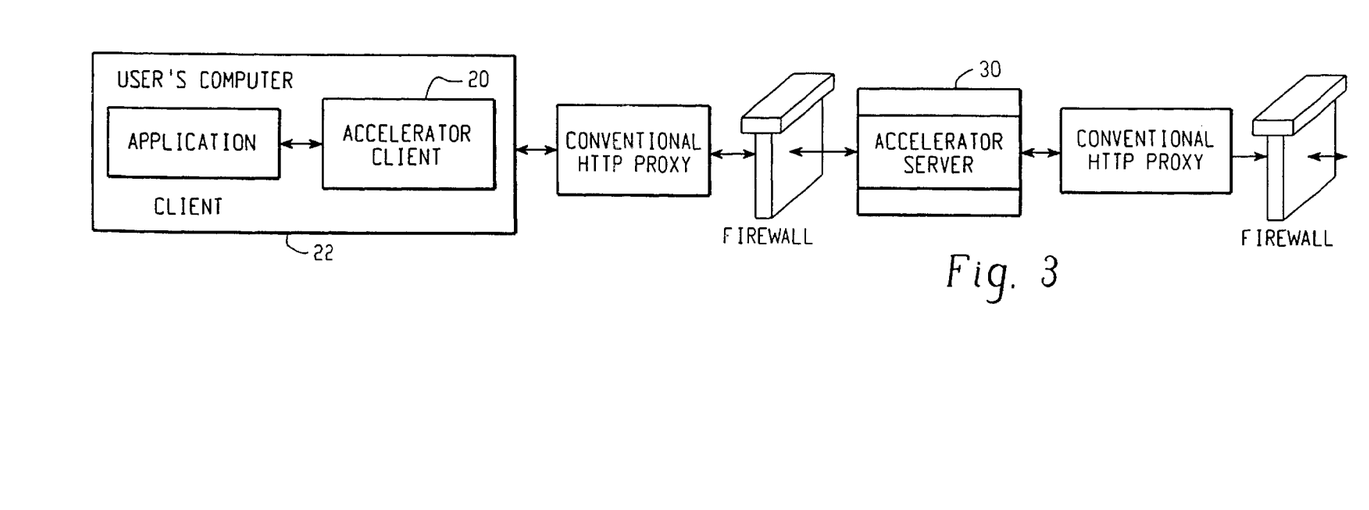
FIG. 3 is an illustration of an Accelerator Client and an Accelerator Server operating from behind a security "firewall"

It should be appreciated that Accelerator Client 20 can work through conventional HTTP Proxy servers and firewalls, as illustrated in FIG. 3.

Figure 8:
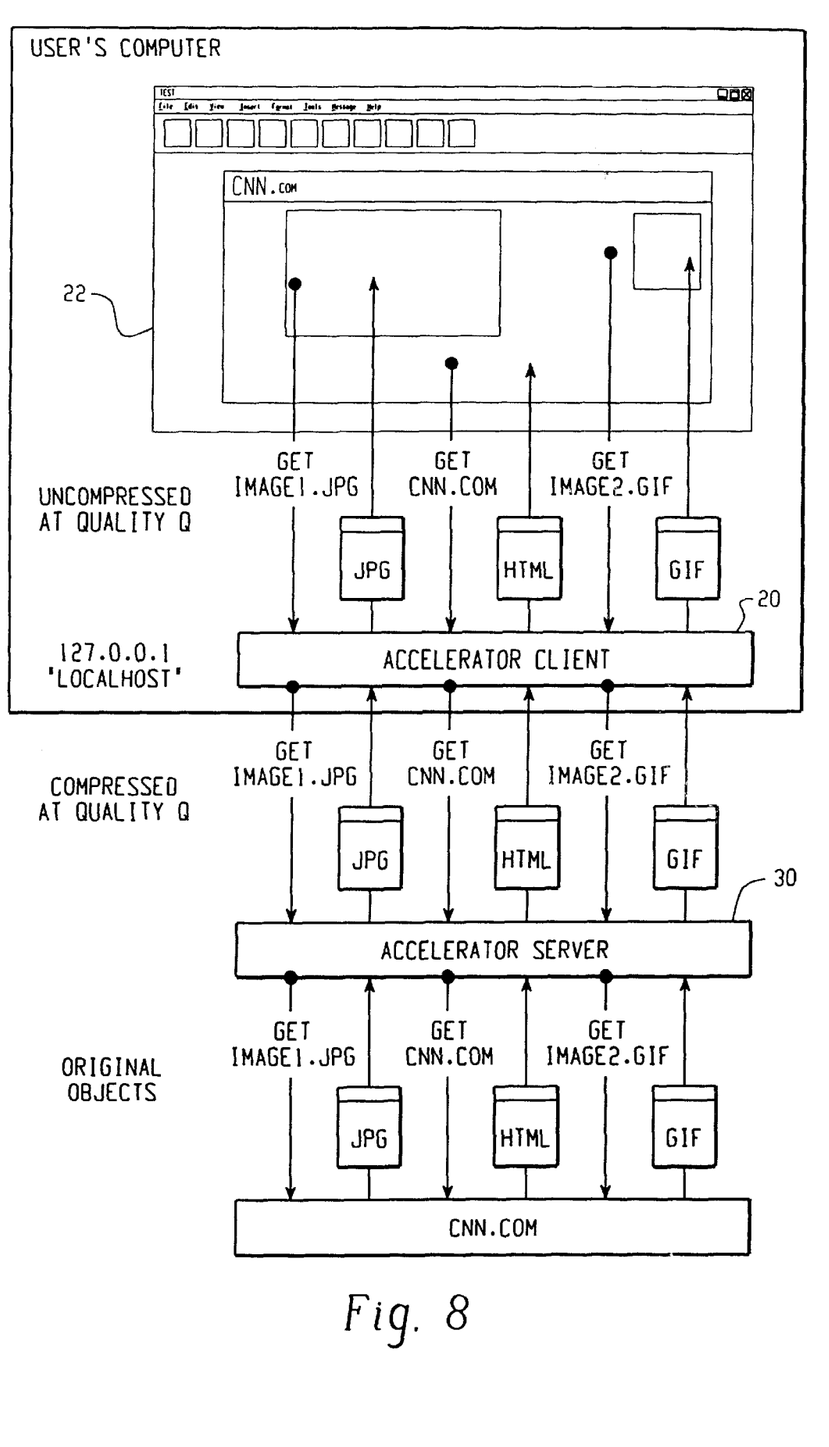
FIG. 8 illustrates the processes of downloading a web page using an Accelerator Client according to a preferred embodiment of the present invention.

FIG. 8 illustrates the case of downloading hypothetical media objects (i.e., image1.jpg, image2.gif) and non-media objects (i.e., HTML text of cnn.com), in response to an Internet GET request. All compression and decompression is done using quality Q, which may be selected by the user. As indicated above quality Q=100 signifies lossless compression, and is typically utilized for non-media objects such as text objects. The following are the steps for data acceleration, according to a preferred embodiment of the present invention, during a web browsing session at client computer 22:

(1) the user's browser (running on client 22) is directed to the localhost as to an HTTP Proxy;

(2) The browser sends the appropriate GET requests for the HTML page. In FIG. 8, the process for downloading the cnn.com web page is shown.

(3) The GET request is intercepted by Accelerator Client 20 which may compress the GET request and forwarded it to Accelerator Server 30 via ISP 26;

(4) Accelerator Server 30 then performs the following:
   A. decompress the GET request (if in compressed form) and download the requested HTML text and/or other data from the Internet 28 in accordance with the GET request,
   B. selectively performing a lossy and/or lossless compression to generate one or more compressed objects, and
   C. send the compressed objects to Accelerator Client 20 via ISP 26.

(5) Accelerator Client then performs the following:
   A. decompresses a compressed object sent by Accelerator Server 30, and
   B. sends the decompressed object to the browser running on client 22.

(6) The browser on client 22 then performs the following:
   A. displays the decompressed object (e.g., text, JPG image, or GIF image),
   B. extracts the embedded links, and
   C. issues requests to Accelerator Client 20 for the next object, and in response thereto Accelerator Client 20 sends the next object (decompressed).

Figure 6A:
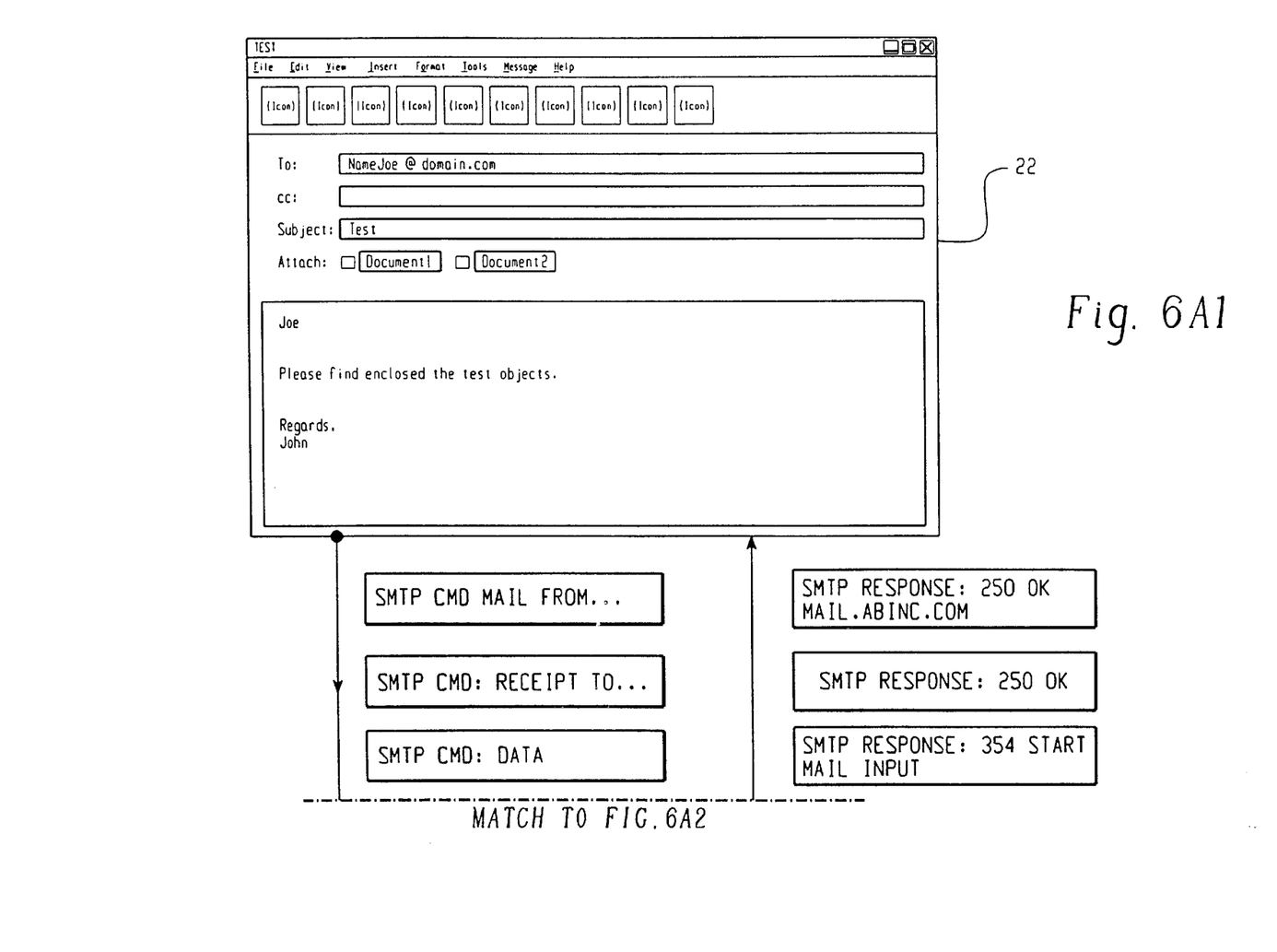
FIGS. 6A and 6B illustrate the process of sending an electronic mail including media and non-media objects, in accordance with a preferred embodiment of the present invention.
Figure 6A:
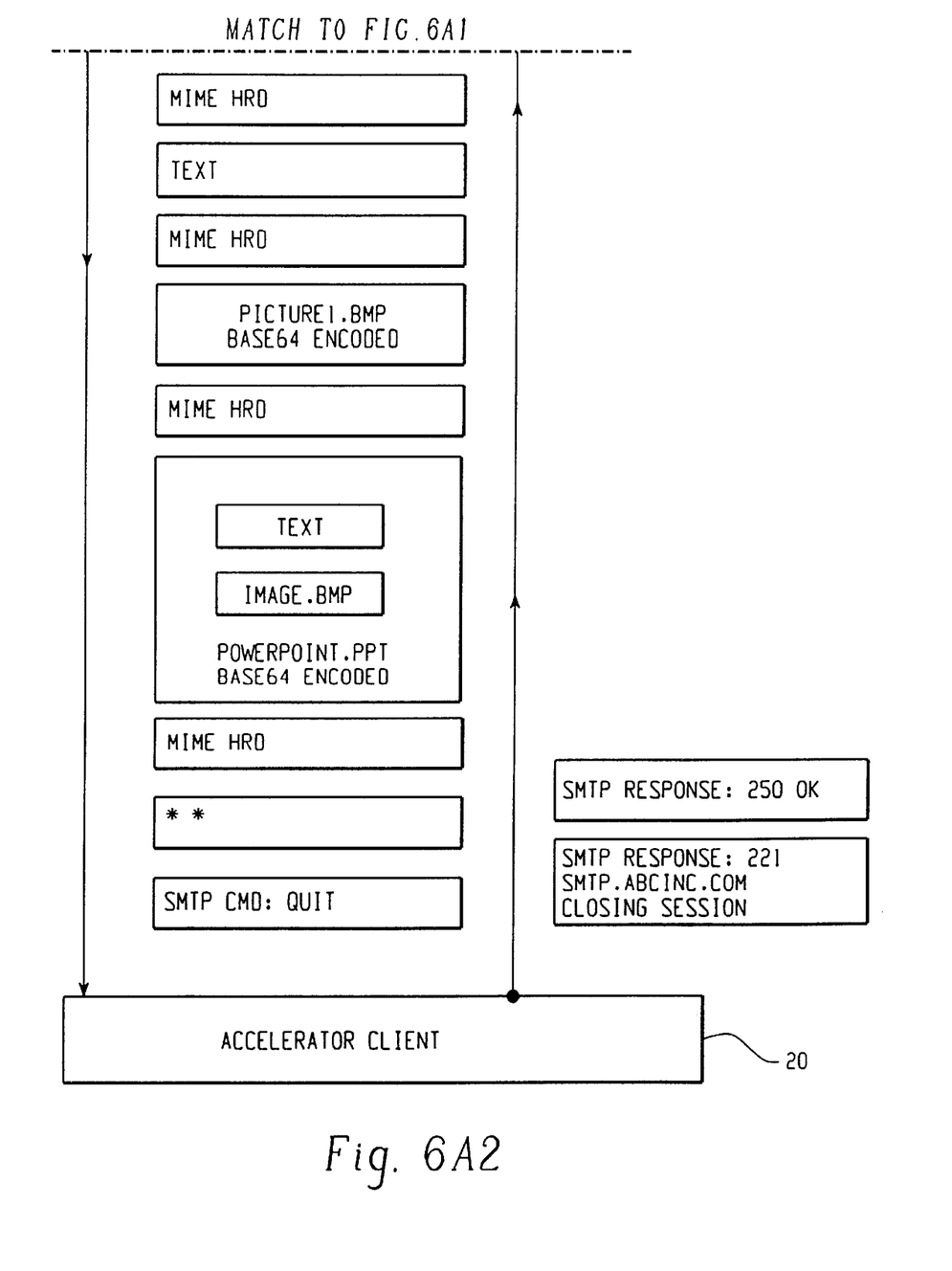
Figure 6B:
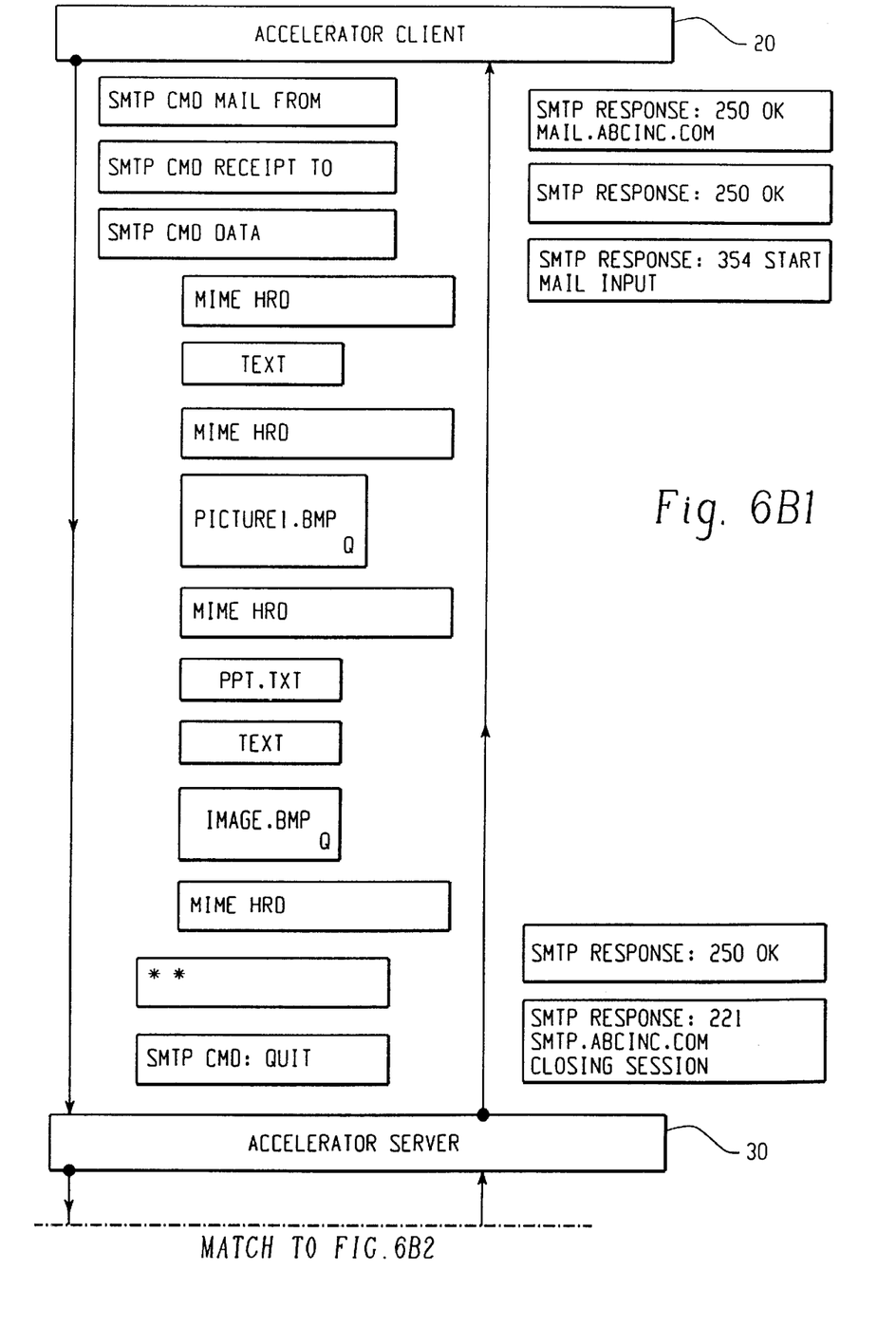
Figure 6B:
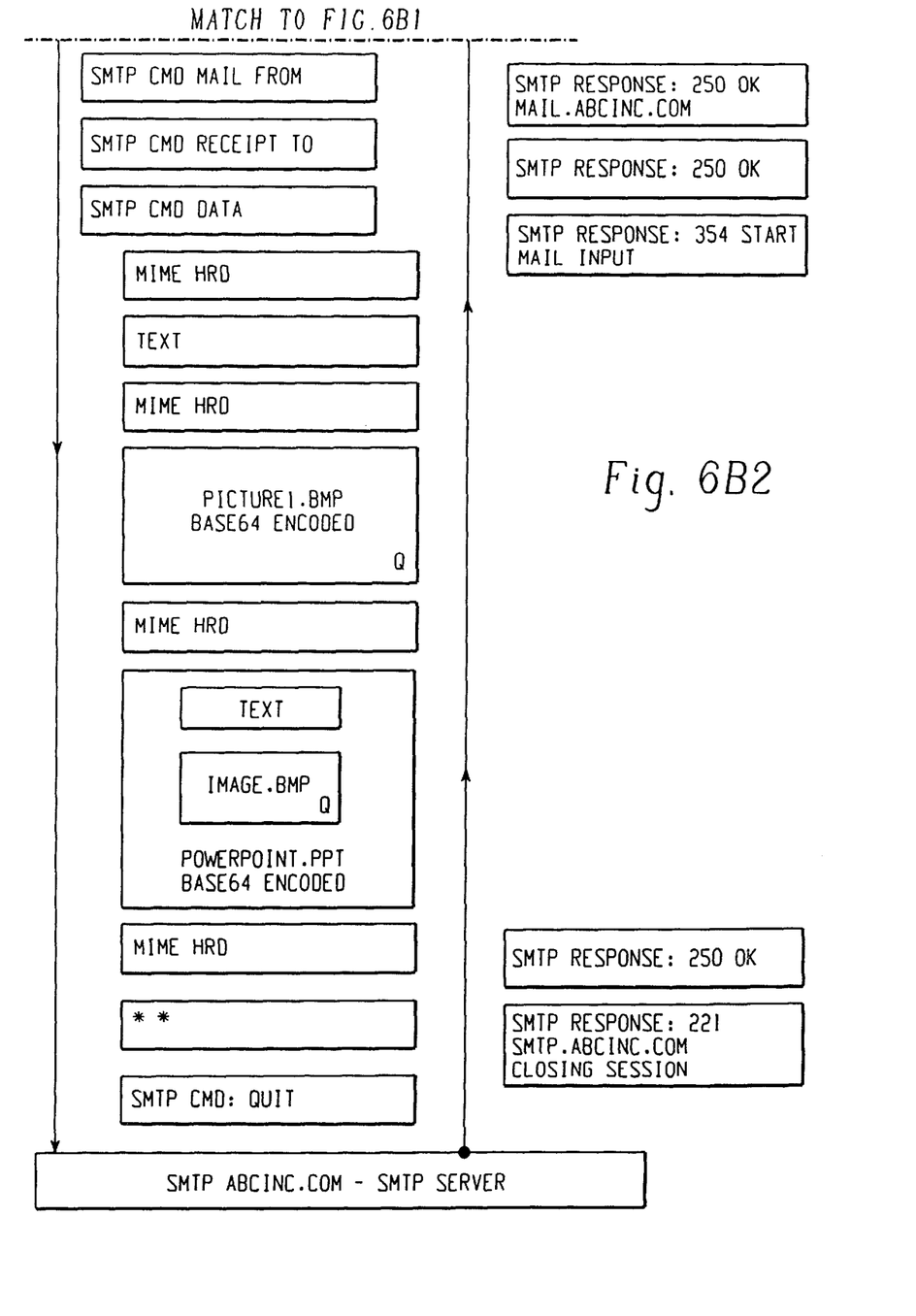

In the case where a user desires to send an electronic mail (email) message, an email client, running on client computer 22, is used to create the email message. Reference is now made to FIGS. 6A and 6B, wherein an email message includes two attachments (picture1.bmb and powerpnt.ppt). The steps involved in accelerating the sending of electronic mail messages, according to a preferred embodiment of the present invention are as follows:

(1) In response to initiation of a "send" command, the email client sends SMTP commands to Accelerator Client 20 instead of the destination SMTP server smtp.abcinc.com (a fictional address);

(2) Accelerator Client 20 forwards these commands to the Accelerator Server 30. It should be noted that AC 20 will selectively compress the data at a quality Q. In this regard, some data may require that it not be compressed in order for the data transfer operation to successfully operate, as will be explained in further detail below;

(2) Accelerator Server 30 decompresses the compressed data and sends the uncompressed data to the destination SMTP server. The response commands. are routed back the same way.

Figure 7A:
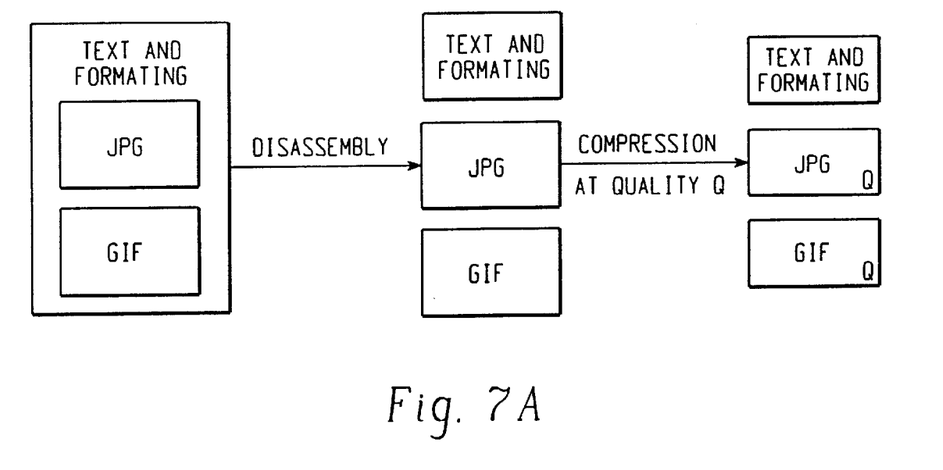
FIG. 7A illustrates the disassembly of a data document into media and non-media objects, and compression thereof.

It should be appreciated that a DATA SMTP command indicates the start of the actual email message. The text message and the attachments come wrapped in MIME headers (MIME HRD). The text and associated formatting are disassembled and all components compressed (lossless) separately. Moreover, attachments (e.g., JPG and GIF files) are unwrapped from MIME enclosure (disassembly) and compressed with the appropriate algorithm at quality Q (FIG. 7A). It should be understood that the MIME headers remain uncompressed.

Figure 7B:
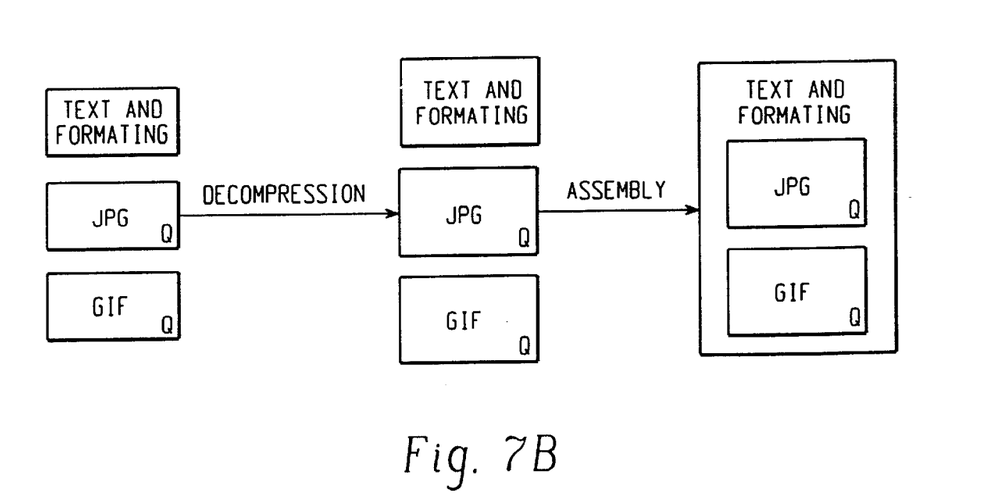
FIG. 7B illustrates the decompression of media and non-media objects, and re-assembly thereof into the original data document.

As indicated above, Accelerator Server 30 reverses the compression process by decompressing the objects (e.g., text and formatting non-media objects, and JPG and GIF media objects) and re-assembling the objects into their original format. All of the objects are reconstructed at quality Q, except the objects compressed without any quality loss (e.g, text and formatting non-media objects). See FIG. 7B.

For receiving Internet emails, a very similar process is used, except that instead of the SMTP protocol, the POP3 (Post Office Protocol version 3) is used. The attachments to the email are wrapped into the same MIME format. In order for these two processes, sending and receiving email to work, it is necessary that the given ISP allow the use of the given SMTP and POP3 servers. For example, at present, Yahoo! Mail can be generally used with any ISP, but mailboxes provided with ATT WORLDNET Internet service or Prodigy Internet service can be used only when connected by those providers.

The invention has been described with reference to a preferred embodiment. Obviously, modifications and alterations will occur to others upon a reading and understanding of this specification. It should be. fully appreciated that while a preferred embodiment of the present invention has been described with reference to the Internet, the present invention is also suitable for use in connection with other communication networks where increased performance in data transfer rates is desired. It is intended that all such modifications and alterations be included insofar as they come within the scope of the appended claims or the equivalents thereof.

Having thus described the invention, it is now claimed:

1. A system for data transfer acceleration comprising:
   an accelerator client associated with a client computer, said accelerator client intercepting data transferred between the client computer and a communications network service provider via a first communications link, wherein said accelerator client compresses data transmitted from the client computer to the communications network service provider, and forwards said compressed data to said communications network service provider, and said accelerator client decompresses compressed data transmitted from the communications network service provider to the client computer, and forwards said uncompressed data to said client computer; and an accelerator server for intercepting data transferred between the communications network service provider and a communications network, via a second communications link, wherein said accelerator server decompresses compressed data transmitted from the communications network service provider to the communications network, and forwards the uncompressed data to the communications network, and said accelerator server compresses data transmitted from the communications network to the communications network service provider, and forwards the compressed data to the communications network service provider, wherein at least one of said accelerator client and said accelerator server includes:

parsing means for parsing uncompressed data into media and non-media objects; and compressing means for compressing at a quality Q said media and non-media objects, in accordance with a compression algorithm, wherein said quality Q is variable in accordance with object type.

2. A system according to claim 1, wherein said non-media objects include at least one of: text and executables.

3. A system according to claim 1, wherein said non-media objects are subject to lossless compression, and said media objects are subject to lossy compression.

4. A system according to claim 1, wherein said accelerator client runs on said client computer.

5. A system according to claim 1, wherein said accelerator client runs on a computing device separate from said client computer.

6. A system according to claim 1, wherein at least one of said accelerator client and accelerator server includes:

decompressing means for decompressing said media and non-media objects; and assembler means for assembling the decompressed media and non-media objects into a decompressed data document.

7. A system according to claim 1, wherein said system includes a conventional HTTP proxy between said accelerator client and said accelerator server.

8. A system according to claim 1, wherein said system includes a conventional HTTP proxy between said accelerator server and said communications network.

9. A system according to claim 1, wherein said system includes a firewall between said accelerator client and said accelerator server.

10. A system according to claim 1, wherein said system includes a firewall between said accelerator server and said communications network.

11. A method of data transfer acceleration comprising:

intercepting data transferred between a client computer and a communications network service provider via a first communications link, wherein data transmitted from the client computer to the communications network service provider is compressed, and forwarded to said communications network service provider, and decompressing compressed data transmitted from the communications network service provider to the client computer, and forwarding said uncompressed data to said client computer; and intercepting data transferred between the communications network service provider and a communications network, via a second communications link, wherein compressed data transmitted from the communications network service provider to the communications network is decompressed, and forwarded to the communications network, and data transmitted from the communications network to the communications network service provider is compressed, and forwarded to the communications network service provider, wherein said compressing steps includes:

parsing said uncompressed data into media and non-media objects; and compressing at a quality Q said media and non-media objects, in accordance with a compression algorithm, wherein said quality Q is variable in accordance with object type.

12. A method according to claim 11, wherein said non-media objects include at least one of: text and executables.

13. A method according to claim 11, wherein said non-media objects are subject to lossless compression, and said media objects are subject to lossy compression.

14. A system for data transfer acceleration comprising:

an accelerator client for intercepting data transferred between a client computer and a communications network service provider via a first communications link, wherein said accelerator client selectively compresses data transmitted from the client computer to the communications network service provider, and forwards the intercepted data to said communications network service provider, and said accelerator client decompresses any compressed data transmitted from the communications network service provider to the client computer, and forwards the intercepted data to said client computer; and an accelerator server for intercepting data transferred between the communications network service provider and a communications network, via a second communications link, wherein said accelerator server decompresses any compressed data transmitted from the communications network service provider to the communications network, and forwards the intercepted data to the communications network, and said accelerator server selectively compresses data transmitted from the communications network to the communications network service provider, and forwards the intercepted data to the communications network service provider, wherein at least one of said accelerator client and said accelerator server includes:

parsing means for parsing uncompressed data into media and non-media objects; and compressing means for compressing at a quality Q said media and non-media objects, in accordance with a compression algorithm, wherein said quality Q is variable in accordance object type.

15. A system according to claim 14, wherein said data includes at least one of media and non-media objects.

16. A system according to claim 15, wherein said non-media objects include at least one of: text and executables.

17. A system according to claim 15, wherein said non-media objects are selectively subject to lossless compression, and said media objects are selectively subject to lossy compression.

18. A system according to claim 14, wherein said accelerator client runs on said client computer.

19. A system according to claim 14, wherein said accelerator client runs on a computer device separate from said client computer.

20. A system according to claim 14, wherein at least one of said accelerator client and accelerator server includes:
   decompression means for decompressing said media and non-media objects; and
   assembler means for assembling the uncompressed media and non-media objects into a data document.

21. A system according to claim 14, wherein said system includes a conventional HTTP proxy between said accelerator client and said accelerator server.

22. A system according to claim 14, wherein said system includes a conventional HTTP proxy between said accelerator server and said communications network.

23. A system according to claim 14, wherein said system includes a firewall between said accelerator client and said accelerator server.

24. A system according to claim 14, wherein said system includes a firewall between said accelerator server and said communications network.

25. A system according to claim 15, wherein header data associated with an electronic mail message is not subject to compression by said accelerator client and said accelerator server.

26. A method of data transfer acceleration comprising:
   intercepting data transferred between a client computer and a communications network service provider via a first communications link, wherein data transmitted from the client computer to the communications network service provider is selectively compressed, and forwarded to said communications network service provider, and decompressing compressed data transmitted from the communications network service provider to the client computer, and forwarding said uncompressed data to said client computer; and
   intercepting data transferred between the communications network service provider and a communications network, via a second communications link, wherein compressed data transmitted from the communications network service provider to the communications network is decompressed, and forwarded to the communications network, and data transmitted from the communications network to the communications network service provider is selectively compressed, and forwarded to the communications network service provider,
   wherein said compressing steps includes:
      parsing said uncompressed data into media and non-media objects; and
      compressing at a quality Q said media and non-media objects, in accordance with a compression algorithm, wherein said quality Q is variable in accordance with object type.

27. A method according to claim 23, wherein said data includes at least one of media and non-media objects.

28. A method according to claim 27, wherein said non-media objects include at least one of: text, formatting data and executables.

29. A method according to claim 27, wherein said non-media objects are subject to lossless compression, and said media objects are subject to lossy compression.

30. A method according to claim 26, wherein header data associated with an electronic mail message is not subject to compression by said accelerator client and said accelerator server.

31. A method according to claim 26, wherein said first communication link has a maximum data transfer rate that is less than or equal to said second communication link.

* * * * *